United States Patent [19]

Horigome et al.

[11] 4,262,333
[45] Apr. 14, 1981

[54] HOLDING OF A TRANSACTION IDENTIFYING SIGNAL IN A TELLER MACHINE

[75] Inventors: Koichi Horigome, Nara; Seizo Okada, Osaka; Katsuji Nishimura, Habikino; Hachizou Yamamoto, Nara, all of Japan

[73] Assignee: Sharp Kabushiki Kaisha, Osaka, Japan

[21] Appl. No.: 60,817

[22] Filed: Jul. 25, 1979

[30] Foreign Application Priority Data

Jul. 25, 1978 [JP] Japan .................. 53-92143

[51] Int. Cl.³ .................. G06F 3/02; G06K 7/01
[52] U.S. Cl. .................. 364/408; 364/405; 364/406; 340/365 S; 235/379
[58] Field of Search .................. 364/401, 403–408, 364/709, 200, 900; 340/365 S, 365 R; 235/379

[56] References Cited

U.S. PATENT DOCUMENTS

| 3,648,020 | 3/1972 | Tateisi et al. | 364/406 |
| 3,778,595 | 12/1973 | Hatanaka et al. | 235/379 |
| 3,781,874 | 12/1973 | Jennings | 340/365 S |
| 3,937,925 | 2/1976 | Boothroyd | 235/379 |
| 3,943,335 | 3/1976 | Kinker et al. | 235/379 |
| 4,020,391 | 4/1977 | Baxter | 340/365 S |
| 4,024,534 | 5/1977 | DuVall | 340/365 S |
| 4,106,011 | 8/1978 | Melanson et al. | 340/365 S |

*Primary Examiner*—Charles E. Atkinson
*Assistant Examiner*—Gary Chin
*Attorney, Agent, or Firm*—Birch, Stewart, Kolasch and Birch

[57] ABSTRACT

A teller machine is disclosed including numeral keys, function keys, a central processor unit, and a printer for printing out transaction data. The teller machine includes a key input system for holding a specific transaction identifying signal when the specific transaction is continuously repeated. The specific transaction identifying signal held in the key input system is developed when the following numeral information is introduced through the numeral keys, thereby omitting the actuation of the specific transaction command key.

3 Claims, 2 Drawing Figures

HOLDING OF A TRANSACTION IDENTIFYING SIGNAL IN A TELLER MACHINE

BACKGROUND AND SUMMARY OF THE INVENTION

The present invention relates to a teller machine and, more particularly, to a teller machine which simplifies the data entry when a same kind of transaction is continuously repeated.

Teller machines are used in a bank, and can perform various kinds of arithmetic calculations in accordance with transaction data and operation commands introduced through a keyboard panel. There is a possibility that a same kind of transaction, such as an ordinary deposit or cash in operation, will be continuously repeated.

Accordingly, an object of the present invention is to simplify the data entry in a teller machine when a same kind of transaction is continuously repeated.

Another object of the present invention is to provide a novel key input system in a teller machine.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a key input system is constructed to hold a specific transaction identifying signal when the specific transaction is continuously repeated. Therefore, the actuation of the specific function key can by omitted at the following data entry of the same kind of transaction.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
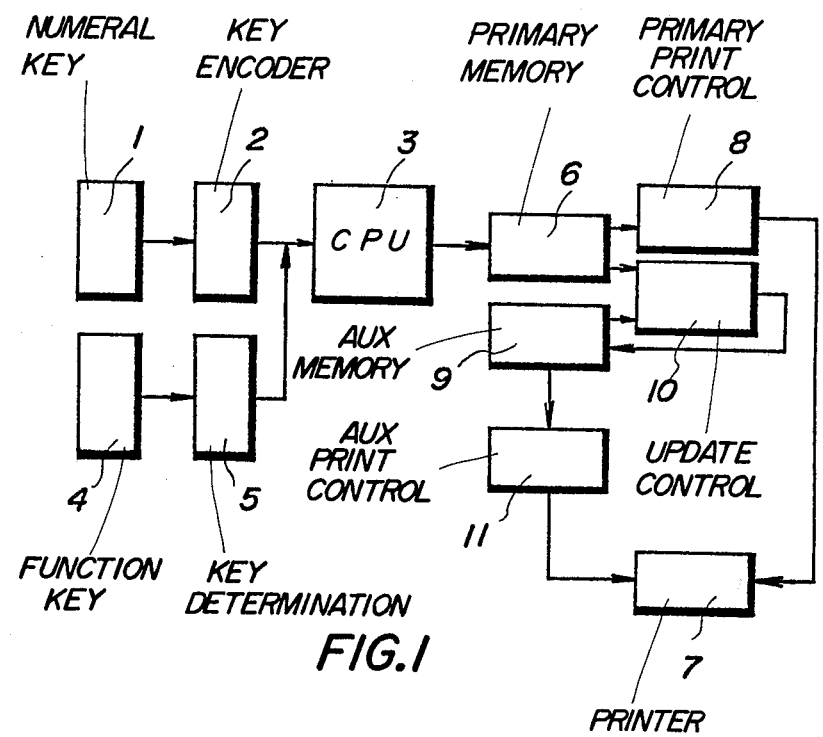
FIG. 1 is a block diagram of a basic construction of a teller machine of the present invention.

Referring now in detail to the drawings, and to facilitate a more complete understanding of the present invention, a basic construction of a teller machine will be first described with reference to FIG. 1.

The teller machine mainly comprises a keyboard panel including numeral keys 1 and function keys 4, a central processor unit 3, and a printer 7. The function keys 4 include a "plus" key, a "minus" key, a "total" key, a "sub-total" key, a "paper feed" key, a "release" key, a "clear" key, a "list" key, a "previous balance" key, an "ordinary deposit" key, a "current deposit" key, a "fixed deposit" key, a "cash out" key, a "cash in" key, a "cash check" key, an "add print" key, a "reading and resetting of totals" key, a "miscellaneous" key, a "miscellaneous cash" key, a "duplicate" key, a "repeat" key, a "balance" key, a "print out" key, an "account number" key, and a "completion" key for indicating the completion of a specific transaction data entry.

Numeral information introduced through the numeral keys 1 is applied to the central processor unit 3 via a key encoder 2. A key determination circuit 5 is connected to the function keys 4 for determining the depressed key included in the function keys 4, thereby developing instruction commands to the central processor unit 3. The thus introduced information and the calculation result derived from the central processor unit 3 are stored in a primary memory 6.

When the introduction of the transaction data is completed, the "completion" key is actuated to indicate the completion of the data entry. Upon actuation of the "completion" key, the central processor unit 3 performs the check operation and, then, transfer the transaction data stored in the primary memory 6 to a primary print control circuit 8. The primary print control circuit 8 activates the printer 7 to print out the transaction data on a journal paper. The transaction data stored in the primary memory 6 is also applied to an update control circuit 10, which functions to update or accumulate the transaction data stored in an auxiliary memory 9. The transaction data stored in the auxiliary memory 9 is printed out through an auxiliary print control circuit 11 and the printer 7 at an operator's choice.

When the transaction data is desired to be printed out on a bill, a bill is inserted into the printer 7 and the "duplicate" key is actuated. Upon actuation of the "duplicate" key, the transaction data stored in the primary memory 6 is applied to the printer 7 through the primary print control circuit 8. The contents stored in the primary memory 6 are cleared when the following transaction data entry operation is conducted.

In the above-mentioned teller machine, the ordinary deposit transaction is, usually, most frequently handled. In the conventional teller machine, the "ordinary deposit" key must be actuated each time when the transaction data is introduced even though the ordinary deposit data entry is continuously repeated. The present invention is to provide a novel key input system which can minimize the key actuation when the same kind of transaction is continuously repeated.

Figure 2:
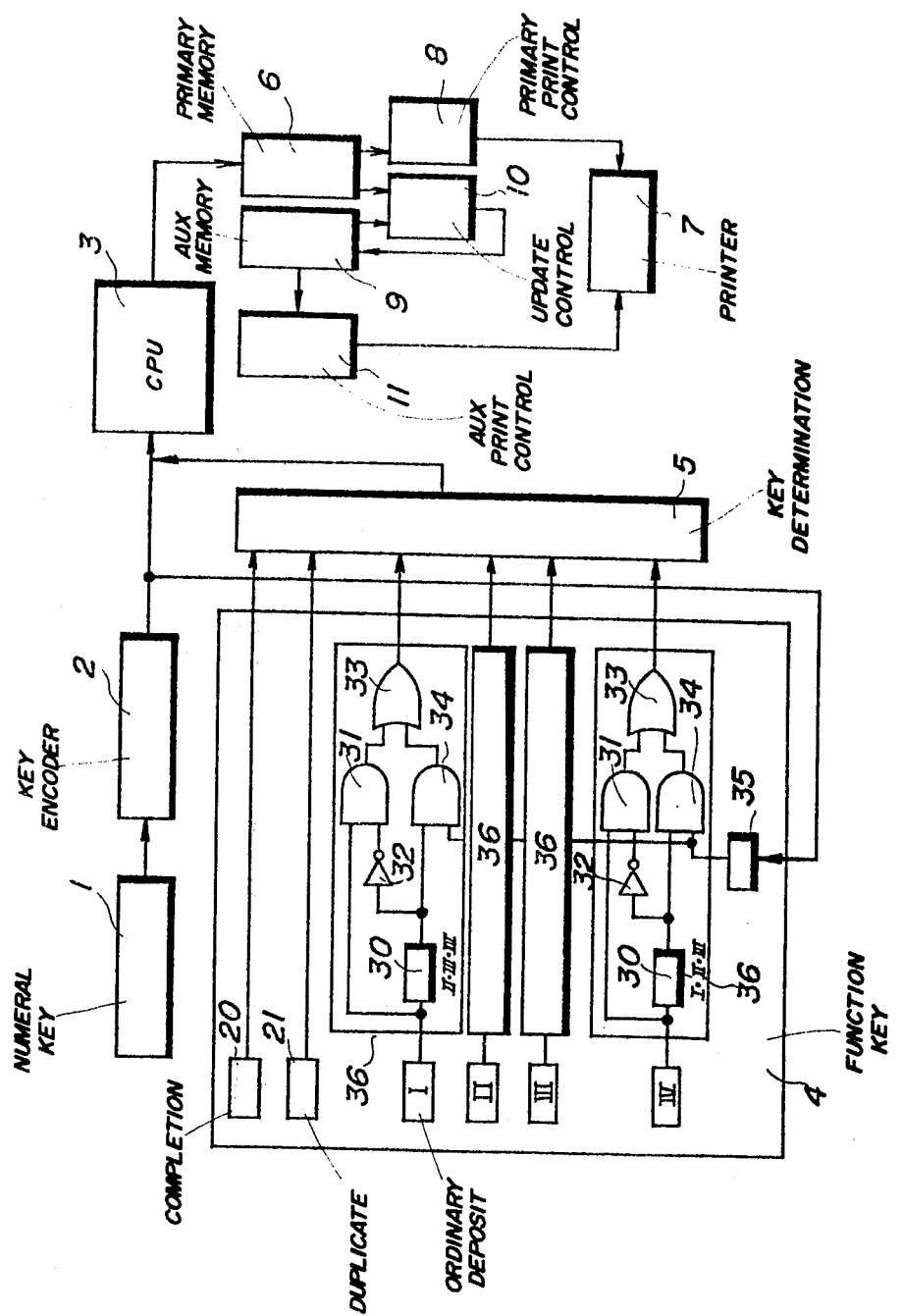
FIG. 2 is a block diagram of an embodiment of a teller machine of the present invention.

FIG. 2 is a block diagram of a teller machine including an embodiment of a key input system of the present invention. Like elements corresponding to those of FIG. 1 are indicated by like numerals.

The key input system mainly comprises a control circuit 36 for maintaining a specific transaction identifying signal. The control circuit 36 is connected, for example, to an "ordinary deposit" key "I".

Now assume that the ordinary deposit transactions for customers "A", "B" and "C" are continuously conducted.

First, an amount "a" received from the customer "A" is introduced into the central processor unit 3 through the numeral keys 1 and the key encoder 2. Then, the ordinary deposit key "I" is actuated to develop a high level logic signal "H" toward an AND gate 31 and a successive key actuation detection circuit 30. At this moment, the successive key actuation detection circuit 30 develops a low level logic signal "L" because the ordinary deposit key "I" is actuated only once. The low level logic signal "L" developed from the successive key actuation detection circuit 30 is applied to the AND gate 31 via an inverter 32. Accordingly, the AND gate 31 develops the key input signal corresponding to the ordinary deposit key "I" toward the key determination circuit 5 through an OR gate 33.

Thus, the central processor unit 3 handles the amount "a" as the ordinary deposit data. The thus introduced ordinary deposit data "a" is introduced and memorized in the primary memory 6. Then, the operator actuates a completion key 20 to print out the ordinary deposit data "a" on the journal paper through the primary print out control circuit 8 and the printer 7. At this moment, the ordinary deposit data "a" is added to the ordinary deposit data stored in the auxiliary memory 9 and the accumulated data is stored in the auxiliary memory 9 at the ordinary deposit memory section. A receipt bill is inserted into the printer 7 and a duplicate key 21 is actuated to print out the receipt bill to be handed to the customer "A".

Next, an amount "b" received from the customer "B" is introduced through the numeral keys 1. Then, the ordinary deposit key "I" is actuated to develop the high level logic signal "H" toward the successive key actuation detection circuit 30 and the AND gate 31. At this moment, the successive key actuation detection circuit 30 develops a high level logic signal "H" because the ordinary deposit key "I" is successively actuated for the customers "A" and "B". The high level logic signal "H" derived from the successive key actuation detection circuit 30 functions to disable the AND gate 31 via the inverter 32, and to enable another AND gate 34.

The other input terminal of the AND gate 34 receives a high level logic signal "H" derived from a numeral key actuation detection circuit 35 which develops the high level logic signal "H" when the numeral keys 1 are actuated. Accordingly, the key input signal corresponding to the ordinary deposit key "I" is applied to the key determination circuit 5 through the AND gate 34 and the OR gate 33. The remaining operation is similar to that is achieved in the case for the customer "A".

The numeral key actuation detection circuit 35 is reset to develop a low level logic signal "L" when any one of the function keys 4 is actuated. The successive key actuation detection circuit 30 connected to the ordinary deposit key "I" is reset when other transaction identifying keys such as a current deposit key "II", a fixed deposit key "III" and a miscellaneous key "IV", or the "clear" key are actuated.

Last, an amount "c" received from the customer "C" is introduced through the numeral keys 1. The numeral key actuation detection circuit 35 develops the high level logic signal "H" to activate the AND gate 34. Since the successive key actuation detection circuit 30 is set to develop the high level logic signal "H" by the preceding transaction data entry operation for the customer "B", the AND gate 34 develops the signal indicating the actuation of the ordinary deposit key "I" without actual actuation of the ordinary deposit key "I". The following operation is similar to that is achieved in the case for the customer "A".

Although in the foregoing embodiment the key actuation is conducted in the order of numeral keys → the transaction kind identifying key → the completion key → the duplicate key, the teller machine can be constructed to respond to the key actuation in the order of the transaction kind identifying key → numeral keys → the completion key → the duplicate key. In this case, the successive key actuation detection circuit 30 is not necessarily reset by the "clear" key.

The present key input system can be constructed through the use of microprocessor techniques.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A teller machine comprising:
    a keyboard including numeral keys and function keys for introducing transaction data into the teller machine;
    a central processor unit for controlling operation modes of the teller machine in response to the transaction data derived from said keyboard;
    storage means for storing the transaction data derived from said central processor unit;
    printer means for printing out the transaction data stored in said storage means; and
    transaction kind identifying means connected to said function keys, said transaction kind identifying means including;
      holding means for maintaining a transaction kind identifying signal representative of a specific function key when said specific function key is successively actuated,
      numeral key actuation detection circuit for developing a detection output when any one of said numeral keys is actuated, and gate means for transferring said transaction kind identifying signal maintained in said holding means to said central processor unit when said detection output is developed from said numeral key actuation detection circuit.

2. The teller machine of claim 1, wherein said function keys include an ordinary deposit key, and said holding means maintains an ordinary deposit identifying signal when said ordinary deposit key is successively actuated.

3. A teller machine for allowing users to perform banking functions by performing transaction information entry operations comprising:
    a keyboard including numeral keys and function keys for introducing transaction data into the teller machine;
    a central processing unit for controlling the operation of the teller machine in response to transaction data provided by said keyboard;
    transfer kind identifying means connected between said keyboard and said central processing unit, said transfer kind identifying means including;
      holding means for maintaining a transaction kind identifying signal representative of a specific function key when said specific function key is successively actuated, and
      transfer means for applying the transaction kind identifying signal present in said holding means to said central processing unit when a new transaction information entry operation is conducted;
    said transfer means enabling the user to perform the new transaction information operation without activation of said specific function key.

* * * * *